(12) United States Patent
Hesselbarth

(10) Patent No.: US 12,534,222 B2
(45) Date of Patent: Jan. 27, 2026

(54) METHOD FOR LANDING AN AIRCRAFT WHICH TAKES OFF AND LANDS VERTICALLY, AIRCRAFT AND LANDING SYSTEM

(71) Applicant: Wingcopter GmbH, Weiterstadt (DE)

(72) Inventor: Jonathan Hesselbarth, Darmstadt (DE)

(73) Assignee: Wingcopter GmbH, Weiterstadt (DE)

(*) Notice: Subject to any disclaimer, the term of this patent is extended or adjusted under 35 U.S.C. 154(b) by 61 days.

(21) Appl. No.: 18/716,610

(22) PCT Filed: Dec. 6, 2022

(86) PCT No.: PCT/EP2022/084636
§ 371 (c)(1),
(2) Date: Jun. 5, 2024

(87) PCT Pub. No.: WO2023/104814
PCT Pub. Date: Jun. 15, 2023

(65) Prior Publication Data
US 2025/0026488 A1   Jan. 23, 2025

(30) Foreign Application Priority Data
Dec. 7, 2021  (DE) .................. 10 2021 132 160.3

(51) Int. Cl.
*B64D 45/08* (2006.01)
*B64C 29/00* (2006.01)
(Continued)

(52) U.S. Cl.
CPC .............. *B64D 45/08* (2013.01); *B64C 29/00* (2013.01); *G08G 5/50* (2025.01); *G08G 5/55* (2025.01)

(58) Field of Classification Search
CPC ...... B64C 29/00; B64D 45/08; G05D 1/0676; G05D 1/102; G05D 1/652;
(Continued)

(56) References Cited

U.S. PATENT DOCUMENTS 11,762,398 B1 * 9/2023 Taylor .................. G05D 1/0676
701/16
2012/0078451 A1   3/2012 Ohtomo et al.
(Continued)

FOREIGN PATENT DOCUMENTS

CN       110618691 A     12/2019
DE   102017112452 A1     12/2018
(Continued)

OTHER PUBLICATIONS

Dotenco, Sergiu, Florian Gallwitz, and Elli Angelopoulou. "Autonomous approach and landing for a low-cost quadrotor using monocular cameras." In Computer Vision—ECCV 2014 Workshops: Zurich, Switzerland, Sep. 6-7 and 12, 2014, Proceedings, Part I 13, pp. 209-222. Springer International Publishing, 2015.

*Primary Examiner* — Fadey S. Jabr
*Assistant Examiner* — Michael J Herrera
(74) *Attorney, Agent, or Firm* — Smartpat PLC

(57) ABSTRACT

A method for landing an aircraft, which takes off and lands vertically, at a predetermined landing site defined by a circular marking that can be captured optically and has a circular outer contour utilizes a landing system. A camera arranged on the aircraft and directed to the landing site is used to capture images electronically, each of which represents a reproduction of the marking detected at least in
(Continued)

sections. Each camera image is evaluated in a control device. The control device is used to fit a geometric object with at least one straight line, which has a predetermined line slope in relation to the camera image, into the reproduction in such a way that the line constitutes a tangent through a contact point to the marking detected at least in sections. The control device steers the aircraft in the direction of the contact point determined in this way.

12 Claims, 4 Drawing Sheets

(51) Int. Cl.
    *G08G 5/50*     (2025.01)
    *G08G 5/55*     (2025.01)

(58) Field of Classification Search
    CPC . G05D 1/654–6548; G05D 1/661–663; G05D 1/667; G05D 2109/23; G08G 5/50; G08G 5/55
    See application file for complete search history.

(56) References Cited

U.S. PATENT DOCUMENTS

| | | |
|---|---|---|
| 2012/0173053 A1 | 7/2012 | Ohtomo et al. |
| 2012/0277934 A1 | 11/2012 | Ohtomo et al. |
| 2014/0081484 A1 | 3/2014 | Covington et al. |
| 2016/0280393 A1 | 9/2016 | Mouton et al. |
| 2016/0307450 A1 | 10/2016 | Songa et al. |
| 2016/0378121 A1 | 12/2016 | Shue |
| 2017/0045894 A1* | 2/2017 | Canoy ............... G08G 5/55 |
| 2017/0152059 A1 | 6/2017 | Peng et al. |
| 2018/0009546 A1 | 1/2018 | Filias et al. |
| 2018/0222602 A1 | 8/2018 | Salesse-Lavergne et al. |
| 2019/0304315 A1* | 10/2019 | Hodges ............... B64D 45/04 |
| 2020/0122829 A1 | 4/2020 | Fauri |
| 2020/0201360 A1 | 6/2020 | Blonder et al. |
| 2022/0365543 A1 | 11/2022 | Hesselbarth et al. |

FOREIGN PATENT DOCUMENTS

| | | |
|---|---|---|
| DE | 102018120198 A1 | 2/2020 |
| EP | 2708853 A1 | 3/2014 |
| GB | 1207951 A | 10/1970 |
| WO | 2016066008 A1 | 5/2016 |

\* cited by examiner

METHOD FOR LANDING AN AIRCRAFT WHICH TAKES OFF AND LANDS VERTICALLY, AIRCRAFT AND LANDING SYSTEM

CROSS-REFERENCE TO RELATED APPLICATION

This application is a national stage application, filed under 35 U.S.C. § 371, of PCT/EP2022/084636, filed on Dec. 6, 2022, which claims the benefit of German Patent Application DE 10 2021 132 160.3, filed on Dec. 7, 2021.

TECHNICAL FIELD

The disclosure relates to a method for landing an aircraft, which takes off and lands vertically, at a predetermined landing site. The disclosure also relates to an aircraft and to a landing system consisting of the aircraft and the landing site.

BACKGROUND

Aircrafts which take off and land vertically are known from the prior art in various designs and sizes, and are used as drones and in the military sector, inter alia. These aircrafts are also frequently used to transport cargo, for example parcels. The aircrafts can be controlled manually, semi-autonomously and fully autonomously.

Quadcopters, for example, are used as aircrafts for transporting cargo. A quadcopter is an aircraft in which four rotors or propellers arranged in one plane and acting perpendicularly downwards are used to generate lift. The propulsion of the quadcopter is generated by tilting the rotor plane. Depending on the drive power, these aircrafts can transport a certain payload over a certain distance. The range is limited by the available battery capacity, depending on the drive power and the payload carried.

Various methods for landing aircrafts are known from the prior art. Patent documents US 2012/0078451 A1, US 2012/0173053 A1, US 2012/0277934 A1, US 2016/0307450 A1, US 2016/0280393 A1, US 2014/0081484 A1, US 2016/0378121 A1, US 2018/0009546 A1, US 2018/0222602 A1, GB 1 207 951 A, WO 2016/066008 A1, EP 2 708 853 A1 and DE 10 2018 120 198 A1 each describe methods that deal with the automatic detection of landing sites and the automated control and landing of vertical take-off and landing aircrafts.

Vertical take-off airplanes are a special type of such aircrafts. Document DE 10 2017 112 452 A1 describes a design of such airplanes. This airplane comprises two wings arranged on opposite sides of a fuselage, wherein two drive units are pivotably mounted on the wings in supporting elements, such as nacelles, which are adapted to the respective purpose and rigidly connected to the wings. However, airplanes are also known, for example, in which no separate fuselage is formed and the wing is formed from two wing halves that are symmetrical along the longitudinal axis, with two drive units being pivotably mounted on each of the wing halves in supporting elements that are adapted to the respective purpose and rigidly connected to the wing halves.

When landing these aircrafts, there is often a requirement to approach a given landing site as precisely as possible and to land in the center of the landing site. For this purpose, the known aircrafts comprise camera equipment by means of which the landing site can be captured during the landing process. For autonomous landing, optical markings such as QR codes or squares are used at the landing sites known from the prior art to mark the center of the respective landing site. These markings are captured by the camera device and the aircraft is steered in the direction of the marking using a control device based on the captured camera image.

In order to use the methods known from the prior art, it is necessary for the camera device to be able to capture the markings arranged at the landing site until landing. In the case of aircrafts for delivering piece goods, the piece goods are often picked up underneath the aircraft and usually in the middle of the fuselage of the aircraft, so that no camera device can be arranged in this area and must be arranged off-center, for example on the underside of a wing on a plane that takes off and lands vertically. However, even with the off-center arrangement of the camera device, the marking arranged in the middle of the landing area might be covered by the piece of cargo arranged underneath the aircraft in the final phase of landing, so that exact positioning of the aircraft is no longer possible.

To avoid this problem, it has already been suggested to aim at markings that are positioned off-center at the landing site so that the marking can always be captured by the camera device, regardless of the altitude of the aircraft. During the landing approach, it is always necessary to orient the aircraft in such a way that the optical marking is within the field of view of the camera device and can be captured by the camera device. As aircrafts are usually aligned in wind direction during vertical flight, i.e. when landing, the direction of flight of the aircraft must be constantly corrected during landing and the marking must continue to be aimed at and controlled at the same time. Aircrafts taking off vertically usually have to be aligned in the wind direction. In addition, it is usually not sufficient to aim at just one point on the landing site, as the center of the landing site is not clearly specified by a single point on the landing site.

SUMMARY

The present application improves the methods known from the prior art for landing an aircraft, which takes off and lands vertically, at a predetermined landing site, the aircraft and landing systems known for this purpose and the aircraft and landing sites in such a way that a landing as precise as possible at a predetermined landing point of the landing site is possible and, at the same time, the control interventions required for this purpose are minimized.

This is achieved by a method for landing an aircraft, which takes off and lands vertically, at a predetermined landing site determined by a circular marking that can be detected optically and has a circular outer contour, wherein camera images are continuously captured electronically by a camera device arranged on the aircraft and directed towards the landing site, each image representing a reproduction of the marking detected at least in sections, wherein each camera image is evaluated in a control device in an automated manner, wherein the control device is used to fit a geometric object with at least one straight line, which has a predetermined line slope in relation to the camera image, into the reproduction in such a way that the line constitutes a tangent through a contact point to the marking detected at least in sections, and wherein the control device controls the aircraft in the direction of the contact point determined in this way. In the method, the camera device regularly captures a section of the marking during the landing approach, so that the reproduction shows a circular segment with a circular arc-shaped outer contour. The geometric object is advantageously fitted into the reproduction in such a way that the line forms a tangent to the arc-shaped outer contour. The contact point determined in this way is controlled by the control device as a target point. However, as soon as the aircraft rotates around its vertical axis, due in particular to varying wind conditions, the camera device detects a different section of the marking. Since the orientation of the geometric object is basically fixed in relation to the camera image, a contact point that has moved on the marking can now simply be determined and used as a target point. In this way, the aircraft always lands within the marking, although the orientation around the vertical axis of the aircraft is not specified. However, this orientation is irrelevant in many practical applications.

The geometric object can be a line. In order to be able to place the line in different circular quadrants of the marking, for example on the outer circumference, the line slope of the line is determined at the beginning of the landing procedure on the basis of the camera image available at this time. Advantageously, this line slope is maintained during the entire landing process.

However, the geometric object can also comprise two lines that are arranged at an angle to each other. In this way, different quadrants can also be approached, wherein at the beginning of the landing procedure it is determined which of the two lines forms the contact point with the marking that is to be used as the target point. This line or the line slope of this line is then used for the subsequent landing approach.

Advantageously, it is provided that the line constitutes a tangent to the outer contour. The outer contour of the marking is particularly easy to identify using conventional camera equipment.

However, it is also possible for the marking to be of annular design and for the line to be tangent to an inner contour. If the marking is of annular design, the marking is sharply defined both on the outer contour and on the inner contour, so that in this case the inner contour can also be easily identified.

However, it is also conceivable that a circle radius and a circle position in the reproduction are calculated on the basis of the camera image according to a predefined algorithm, whereby information on the outer contour and/or the inner contour recognized in the reproduction is taken into account.

Advantageously, it is provided that the object is fitted into the reproduction in such a way that the line forms the tangent in a predetermined camera image area when the reproduction includes two opposite sections of the marking. Especially at the beginning of the landing approach, it is possible that the reproduction shows the entire marking. In this case, the line can be applied tangentially to the marking at two points. It is therefore advisable to specify a camera image area in which the line is fitted into the reproduction. In this way, it is possible to ensure that the aircraft lands within the marking.

In order to achieve the central positioning of the aircraft within the marking in a particularly simple and reliable manner, it is provided that the object is fitted into the reproduction in such a way that the line forms the tangent at an upper semicircle of the marking as seen from the aircraft in the direction of flight, when the camera device is located in front of the landing target point in the direction of flight with respect to a landing target point, and in that the object is fitted into the reproduction in such a way that the line forms the tangent at a lower semicircle of the marking as seen from the aircraft in the direction of flight when the camera device is located behind the landing target point in the direction of flight with respect to the landing target point. The landing target point is a specified point on the aircraft that is as central as possible within the marking when the aircraft has landed. By approaching the upper semicircle in the camera image when capturing the entire marking when the camera device is in front of the landing target point and approaching the lower semicircle when the landing target point is in front of the camera device in the direction of flight, the aircraft lands safely within the marking.

To determine the semicircles or to determine the contact point, it may be advantageous to use the control device to process the camera image on the basis of a predefined image processing algorithm and to determine the circle parameters of the marking. The entire marking or, for example, the outer contour can then be reconstructed on this basis.

In this case, if the line can be applied tangentially at two points to the depicted marking in the reproduction, in order to enable simple control of the aircraft in the direction of the center of the marking, the line can be applied to the quadrant of the circular reproduction in which the contact point is furthest away from a center point of the reproduction.

The object is advantageously fitted into the reproduction in such a way that the line forms the tangent at a right semicircle of the marking as seen from the aircraft in the direction of flight when the camera device is located to the right of the landing target point in the direction of flight with respect to a landing target point and that the object is fitted into the reproduction in such a way, that the line forms the tangent at a left semicircle of the marking seen from the aircraft in the direction of flight when the camera device is to the left of the landing target point in relation to the landing target point in the direction of flight. In this way, a reliable landing of the aircraft within the marking is achieved.

The object stated at the beginning is also achieved by an aircraft for carrying out the method described above, wherein the aircraft has an aircraft base body, a control device and a camera device, wherein the camera device is arranged on the aircraft base body at a distance from at least one landing target point of the aircraft base body, wherein camera distances to the various landing target points can differ from one another in the case of several landing target points. This ensures that the camera device can capture the marking at least in sections at any time during the landing approach. The camera device is advantageously arranged on the underside of the aircraft. However, it is also possible that the camera device is arranged, for example, on one side of the aircraft and is directed to the landing site during the landing process. If the aircraft is an airplane, the camera device may advantageously be arranged on an underside of one of the wings, for example.

Advantageously, it is provided that the line slope with in relation to a two-dimensional aircraft coordinate system, which is defined by a longitudinal axis and a transverse axis of the aircraft, is predetermined for each landing target point such that the line slope corresponds to a vertical line slope of a vertical line projected into the aircraft coordinate system on a connecting line between the respective landing target point and a center point of the camera device. By controlling the aircraft in the method in such a way that the camera device is located as directly as possible above the contact point during landing, it is possible to ensure that the landing target point is securely located within the marking during landing by specifying the line slope in this way.

The object underlying the disclosure is also achieved by a landing system with a landing site and the aircraft described above, wherein a circular radius of the marking corresponds to at least one camera distance. In this way, it is particularly easy to achieve that the landing target point assigned to the camera distance is located within the marking when the aircraft has landed on the landing site.

In order to achieve as centered a landing of the landing target point as possible within the marking, it is provided that the radius corresponds to the camera distance. Since the aircraft is located within the marking when landing due to the control system and the camera device is located at least in the immediate vicinity or directly above the outer circumference or the inner circumference of the marking due to the controlled touch point, the radius can be specified to determine which part of the aircraft is located centrally above the marking.

This can also be used in particular for the delivery of parcels. If, for example, a parcel is to be delivered automatically to a receiving station, this receiving station could advantageously be arranged centrally within the marking and the radius of the marking could correspond to the camera distance between the parcel center point and the camera device. In this case, the parcel center point would be the landing target point. In this way, the parcel could simply be reliably transferred to the receiving station.

Exact positioning of the landing target point during landing in the center of the marking can be achieved with the measures described above, for example, in that a) the radius corresponds to the camera distance, that b) the line slope corresponds to the vertical line slope and that c) depending on the relative position of the landing target point and the camera device to each other, the upper semicircle or the lower semicircle are headed for.

For example, in order to be able to transport several parcels with one aircraft and deliver them to different landing sites, the disclosure provides for the landing site to have multiple circular markings that can be detected optically, wherein the radii of the markings correspond to the different camera distances. For example, three parcels could be arranged on the underside of the aircraft whose parcel center points have different camera distances. For the various landing approaches, the marking whose radius corresponds to the camera distance corresponding to the parcel to be delivered can then be selected for orientation.

For easy differentiation of the radii of the markings used or the camera distances assigned to these radii, it is advantageous for the markings to be designed in different colors. For example, the marking whose radius corresponds to the camera distance 1 of the first parcel to be delivered could be designed in red, the marking whose radius corresponds to the camera distance 2 of the second parcel to be delivered could be designed in green and the marking whose radius corresponds to the camera distance 3 of the third parcel to be delivered could be designed in blue.

In order to be able to differentiate between the various markings, it can advantageously also be provided for the markings to have unique patterns, barcodes, dot-matrix codes or comparable identification features. In addition, the markings can be designed self-luminous or can be illuminated during landing in order to better identify the markings during landing. A lighting device for illuminating the markings can be located either near the landing site or on the aircraft. The color design of the markings and/or the lighting can advantageously be specified in such a way that it is also particularly easy visible at night or in fog by means of a suitable camera device.

Advantageously, it is provided that the markings are arranged concentrically to one another. In this way, for example, a receiving station for parcels can be arranged centrally within the markings. By using the marking assigned to the associated camera distance, the respective parcel is always located above the center area of the marking when the aircraft has landed, so that each parcel located below the aircraft can be safely deposited in the receiving station. In addition to the colored design of the markings, the disclosure also provides for the use of special patterns within the markings with which the radii can be identified by the control device of the aircraft.

A particularly simple design of the markings is achieved by the fact that the markings are of annular design. However, it is also possible that the markings represent circular areas.

Further advantageous configurations are explained in greater detail with reference to the exemplary embodiments shown in the drawing.

DETAILED DESCRIPTION

Figure 1:
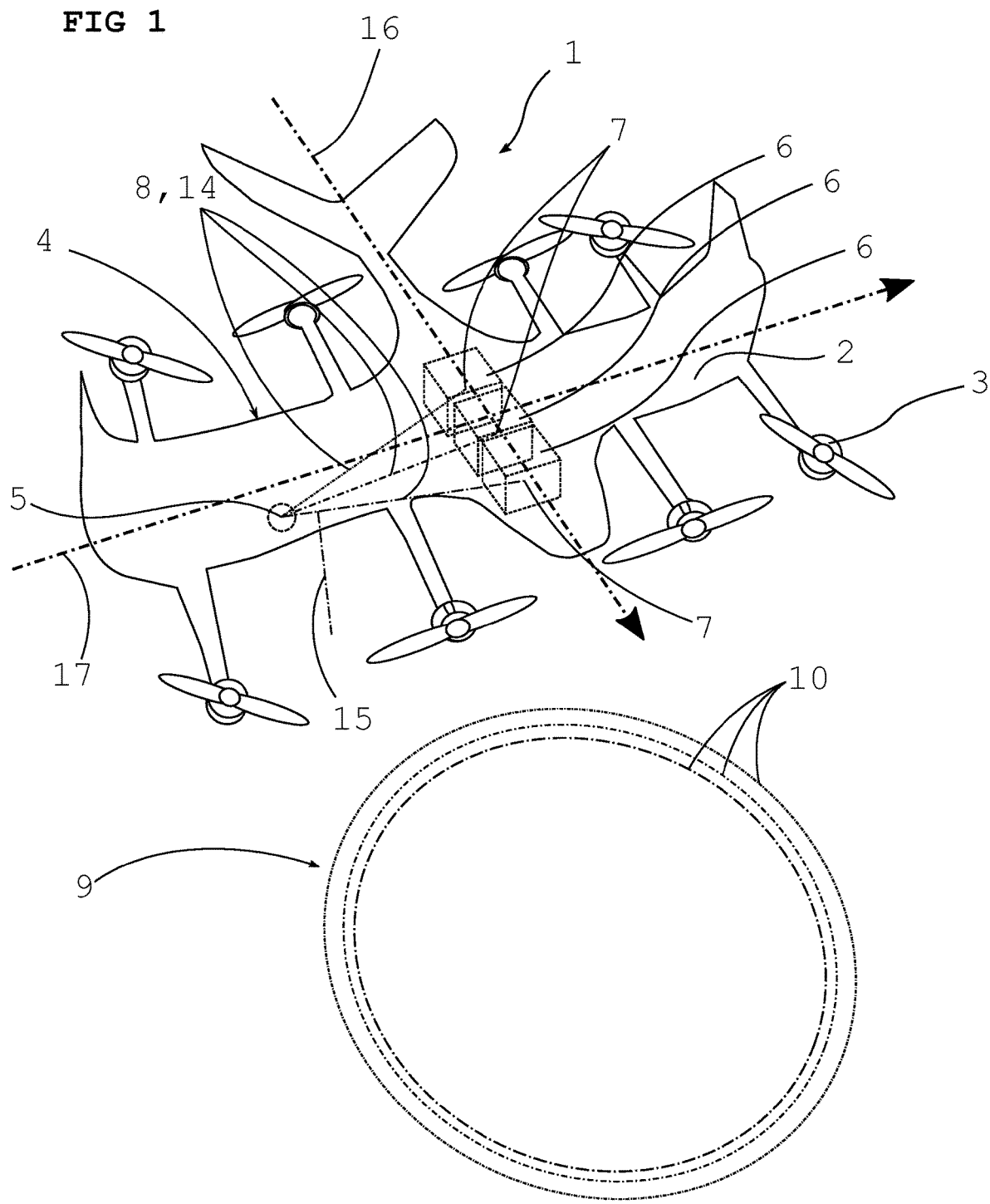
FIG. 1 shows a schematic illustration of a landing system.

FIG. 1 schematically shows an aircraft 1, wherein the aircraft 1 is an airplane that takes off and lands vertically. For take-off and landing, rotors 3 arranged on the wings 2 of the aircraft 1 can be pivoted into a vertical-flight position. In the illustration, a wing 2 and a rotor 3 are denoted with a reference character by way of example.

The aircraft 1 comprises an aircraft base body 4, a control device (not shown separately) and a camera device 5. The aircraft base body 4 comprises, inter alia, the wings 2. The camera device 5 is arranged on one of the wings 2 at a distance from three parcels 6, the parcel center points of which each form landing target points 7 of the aircraft base body 4. The camera distances 8 to the three landing target points 7 differ from one another.

FIG. 1 also shows a landing site 9 schematically. The landing site 9 has three circular markings 10 that can be detected optically, each with a circular outer contour. The radii of the markings 10 correspond to the different camera distances 8. The markings 10 are in color and arranged concentrically to one another.

In addition, FIG. 1 schematically shows the determination of the line slope on the basis of a vertical line slope of a vertical line 15 to a connecting line 14. The line slope is specified for each landing target point 7 in relation to a two-dimensional aircraft coordinate system, which is defined by a longitudinal axis 16 and a transverse axis 17 of the aircraft 1, in such a way that the line slope corresponds to a vertical line slope of the vertical line 15 projected into the aircraft coordinate system on the connecting line 14 between the respective landing target point 7 and a center point of the camera device 5. The vertical line slope in the aircraft coordinate system is adopted as the line slope in a camera image coordinate system.

Figure 2A:
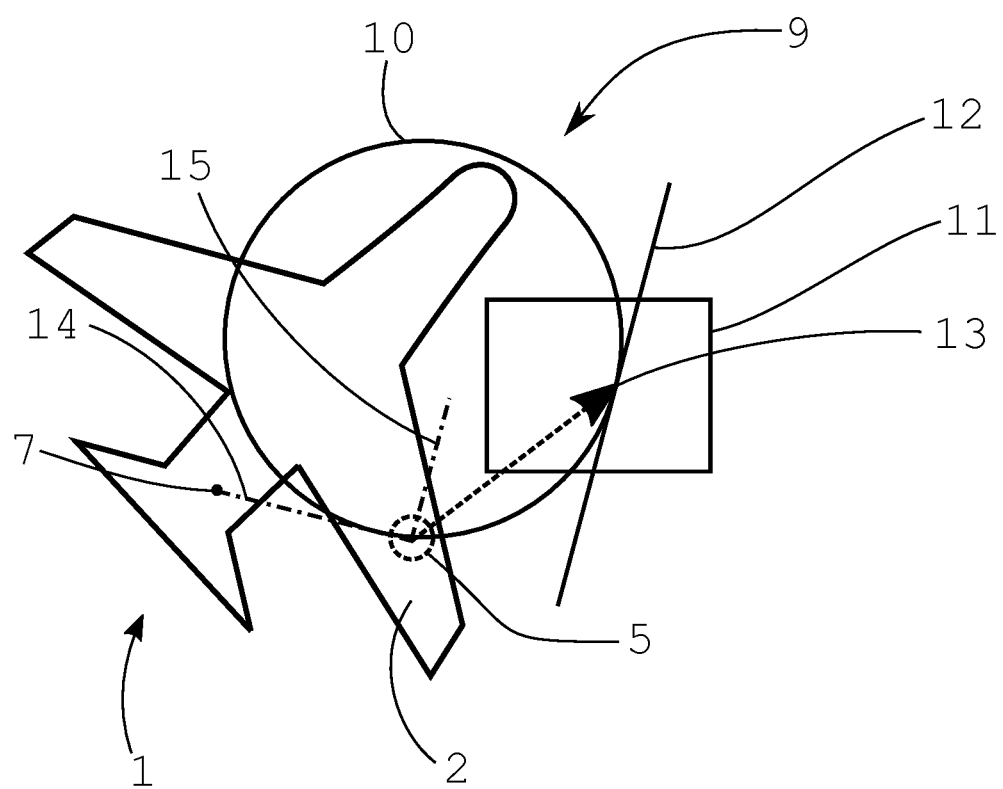
FIGS. 2a to 2c a schematically illustrate a method for landing an aircraft in a landing system.
Figure 2B:
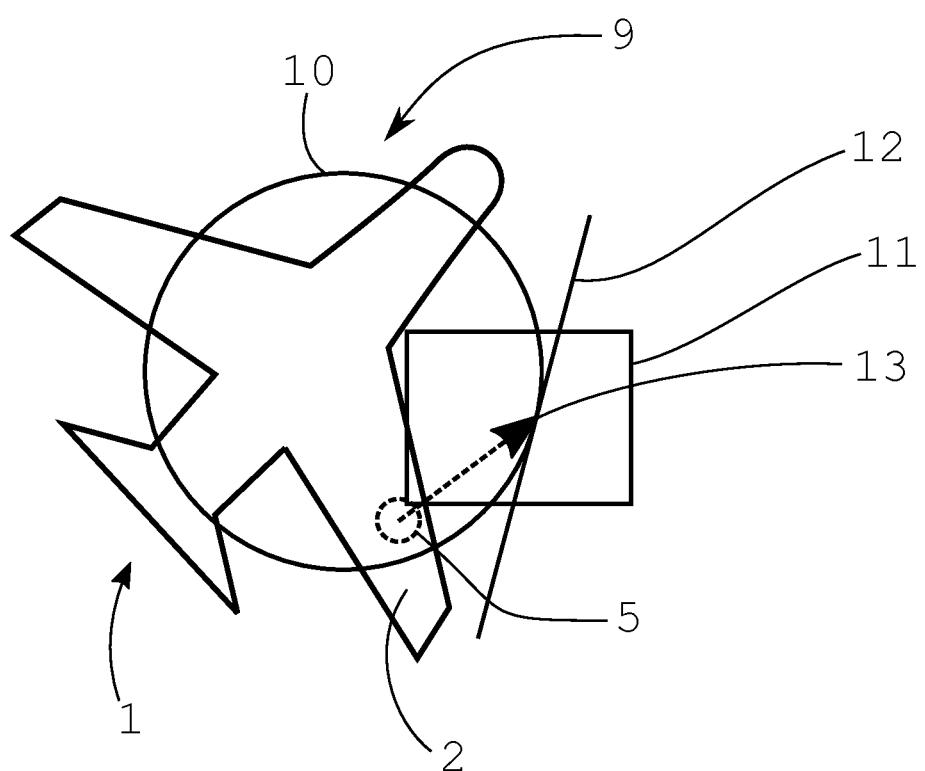
Figure 2C:
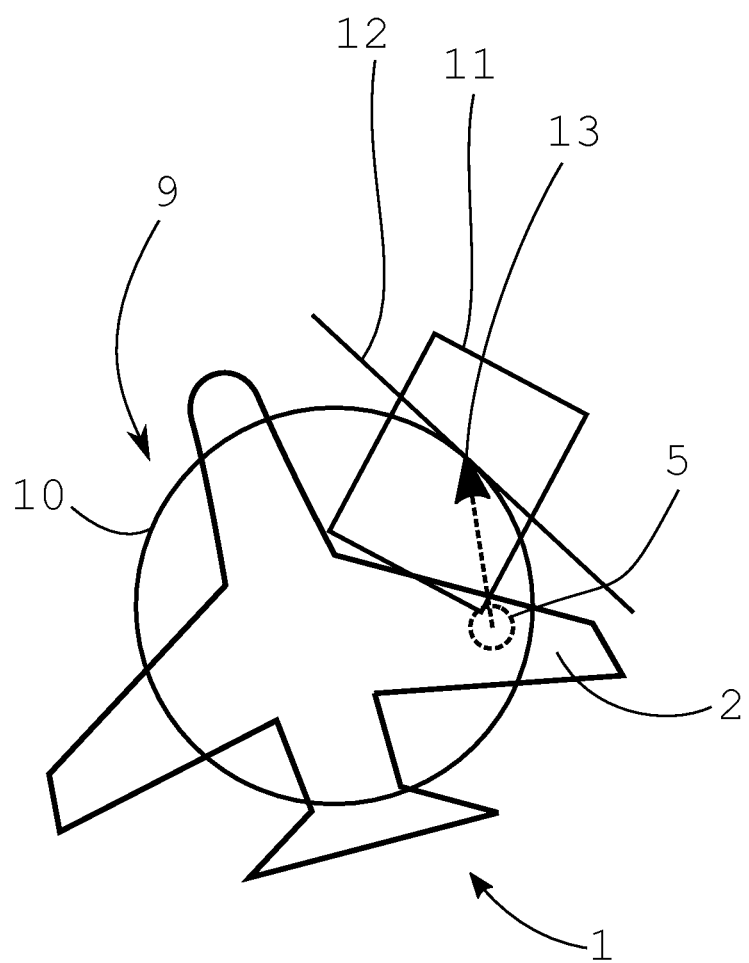

FIGS. 2a to 2c schematically show an approach to a landing site 9 with a circular marking 10 that can be detected optically. A schematically illustrated rectangular camera image 11 can be captured with the camera device 5 arranged on the wing 2. The camera images 11 shown in FIGS. 2a to 2c each represent a reproduction of the marking 10 detected in sections. The control device, which is not shown, is used to fit a straight line 12, which has a predetermined line slope in relation to the camera image 11 and corresponds to a vertical line slope of the vertical line 15, into the reproduction in such a way that the line 12 constitutes a tangent through a contact point 13 to the marking 10 detected in sections. The aircraft 1 is then steered in the direction of the contact point 13 determined in this way by means of the control device.

In the illustration in FIG. 2b, the aircraft 1 has already flown somewhat closer to the contact point 13 already determined in the illustration in FIG. 2a. In the illustration in FIG. 2c, the aircraft 1 has rotated around its vertical axis due to varied wind conditions. As a result, the camera image 11 that can be captured by the camera device 5 was also shifted. When fitting the line 12 into the reproduction determined in FIG. 2c, the contact point 13 was shifted and the aircraft 1 is steered further in the direction of the shifted contact point 13.

LIST OF REFERENCE CHARACTERS

- 1 Aircraft
- 2 Wings
- 3 Rotor
- 4 Aircraft base body
- 5 Camera device
- 6 Parcel
- 7 Landing target point
- 8 Camera distance
- 9 Landing site
- 10 Marking
- 11 Camera image
- 12 Line
- 13 Contact point
- 14 Connecting line
- 15 Vertical line
- 16 Longitudinal axis
- 17 Transverse axis

The invention claimed is:

1. A method for landing an aircraft (1) at a landing site (9), wherein the aircraft (1) takes off and lands vertically, and wherein the landing site (9) is defined by a circular marking that can be detected optically (10) and has a circular outer contour, the method comprising:
continuously electronically capturing camera images (11) by a camera device (5) arranged on the aircraft (1) and directed towards the landing site (9), which images each show a reproduction of the circular marking (10) detected at least in sections;
evaluating each of the camera images (11) in a control device in an automated manner;
using the control device to fit a geometric object with a straight line (12), which has a predetermined line slope in relation to the camera image (11), into the reproduction in such a way that the straight line (12) constitutes a tangent through a contact point (13) to the marking (10) detected at least in sections; and
controlling the aircraft (1), by the control device, in the direction of the contact point (13).

2. The method according to claim 1, wherein the straight line (12) constitutes a tangent to the circular outer contour.

3. The method according to claim 1, wherein the marking (10) is of circular design and the straight line (12) constitutes a tangent to an inner contour.

4. The method according to claim 1, wherein the geometric object is fitted into the reproduction in such a way that the straight line (12) forms the tangent in a predetermined camera image area when the reproduction includes two opposite sections of the marking (10).

5. The method according to claim 1,
wherein the geometric object is fitted into the reproduction such that the straight line (12) forms the tangent at an upper semicircle of the marking (10), as seen from the aircraft (1) in the direction of flight, when the camera device (5) is located in front of a landing target point (7) in the direction of flight with respect to the landing target point (7), and
wherein the geometric object is fitted into the reproduction such that the straight line (12) forms the tangent at a lower semicircle of the marking (10), as seen from the aircraft (1) in the direction of flight, when the camera device (5) is located behind the landing target point (7) in the direction of flight with respect to the landing target point (7).

6. An aircraft (1), comprising:
an aircraft base body (4);
a control device; and
a camera (5),
wherein the camera (5) is arranged on the aircraft base body (4) at a distance from various landing target points (7) of the aircraft base body (4),
wherein camera distances (8) to the various landing target points (7) differ from one another, and
wherein the control device is configured
to evaluate camera images (11) captured by the camera in an automated manner, the camera images (11) showing a reproduction of a marking (10) having a circular outer contour identifying a landing site (9),
to fit a geometric object with at least one straight line (12), which has a predetermined line slope in relation to the camera image (11), into the reproduction in such a way that the straight line (12) constitutes a tangent through a contact point (13) to the marking (10) detected at least in sections, and
to control the aircraft (1) towards the contact point (13).

7. The aircraft (1) according to claim 6,
wherein the predetermined line slope in relation to a two-dimensional aircraft coordinate system, which is defined by a longitudinal axis (16) and a transverse axis (17) of the aircraft (1), is predetermined for each respective landing target point (7) such that the predetermined line slope corresponds to a vertical line slope of a vertical line (15) projected into the aircraft coordinate system on a connecting line (14) between the respective landing target point (7) and a center point of the camera (5).

8. A landing system, comprising:
a landing site (9); and
the aircraft (1) according to claim 6,
wherein a circular radius of the marking (10) corresponds to at least one camera distance (8).

9. The landing system according to claim 8,
wherein the landing site (9) comprises multiple circular markings that can be detected optically (10),
wherein radii of the markings (10) correspond to different camera distances (8).

10. The landing system according to claim 9,
wherein the markings (10) are designed in different colors.

11. The landing system according to claim 9,
wherein the markings (10) are arranged concentrically to one another.

12. The landing system according to claim 9,
wherein the markings (10) are of annular design.

* * * * *